July 18, 1944.  H. HELTZER ET AL  2,354,018
LIGHT REFLECTOR SHEET
Filed Aug. 3, 1940
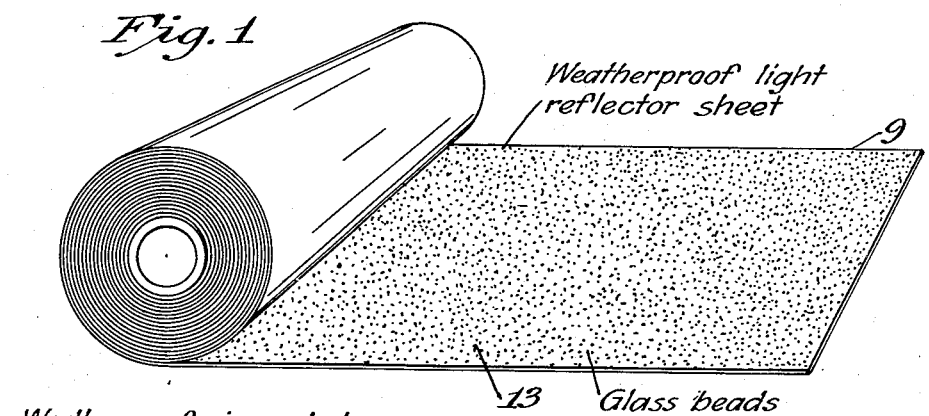
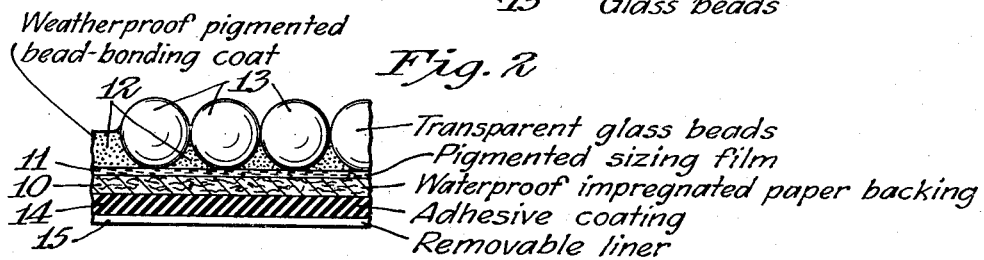
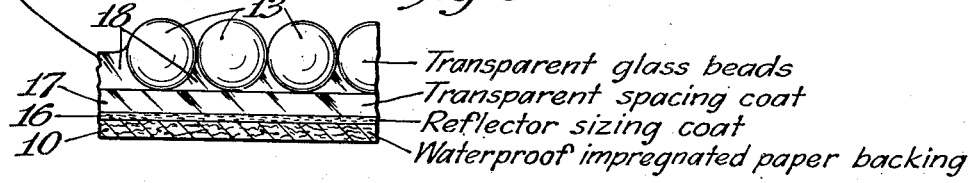
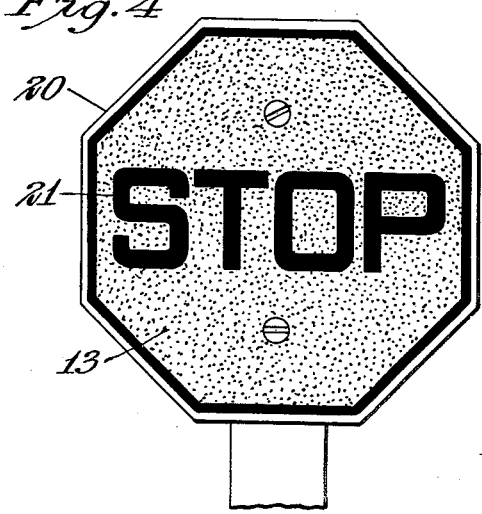
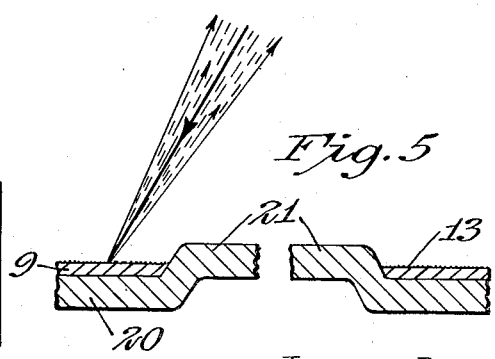
Inventors
Harry Heltzer
John Edmund Clarke
By Paul Carpenter
Attorney Patented July 18, 1944

2,354,018

UNITED STATES PATENT OFFICE 2,354,018

LIGHT REFLECTOR SHEET

Harry Heltzer and John Edmund Clarke, St. Paul, Minn., assignors to Minnesota Mining & Manufacturing Company, St. Paul, Minn., a corporation of Delaware Application August 3, 1940, Serial No. 350,642

25 Claims. (Cl. 88—82)

This invention relates to reflex light-reflecting signs and markers, and to weatherproof reflex light reflector sheet material adapted to use in making outdoor signs, markers, guides and the like. The sheet material may, for example, have an outer layer of small transparent glass beads united to a flexible water-resistant backing by a weatherproof flexible bonding layer in which they are partially embedded. Reflecting means are incorporated so as to be behind the beads, as in the bonding layer, or the reflecting means may be located under a transparent bonding layer, so that an incident beam or ray of light is refracted and reflected in such manner that most of the light is selectively directed or returned back toward the source in a cone having a small angle, even though the incident light strikes at an angle (see Fig. 5).

Such reflection is to be distinguished from that produced by a plane reflector (such as a flat metallic surface), where an incident ray is reflected as a ray at an angle equal to the angle of incidence but on the other side of a line drawn normal to the surface at the point of incidence. It is also to be distinguished from the type of reflection produced by a diffusing surface (such as the surface of blotting paper), where an incident ray is reflected in all directions with approximately equal intensity distribution over a wide angle. In the first case, an observer must be located substantially on the line of reflection in order to see the reflected light, intense as it may be. In the second case, the diffusion of light over a wide angle greatly reduces the intensity of that directed toward the observer. But in the present case, where the reflection may be termed "reflexive," the observer may be at a small angle from the line of incident light, and the light may strike the reflector at an angle, and yet he will be within the cone of reflected light which is of high intensity. This means, for example, that the driver of an automobile whose headlights illuminate the beaded reflector sheet, even though at an angle, will be able to see the reflected light at a great distance. In approaching a sign made from the reflector sheet material of this invention, the sign will be noticed and be readable long before an ordinary sign would be visible.

We are aware that this general optical principle has previously been employed in outdoor signs and markers, for which reason a more detailed explanation is unnecessary. We are concerned, however, with the embodiment of this principle in a novel article of manufacture.

In making beaded reflectors for outdoor use, it is of course virtually essential that the reflector be weatherproof. In past signs of the beaded reflexive type, the beads have been bonded to a substantially rigid base or backing such as sheet iron and have been bonded in place as a step in the making of the sign. This has easily permitted the use of expedients for bonding the beads so as to produce a weather-resistant union of the beads. For example, beads have been embedded in the sign enamel prior to baking at a high temperature. Such enamels cannot be used on flexible backings, particularly when of a nature (such as paper or cloth) which precludes use of high temperatures. Also, in the making of temporary advertising signs (such as billboards), it has been proposed to stick beads to the surface with a point or lacquer; but such transient reflectors do not have to be weatherproof in any real or permanent sense and there is no flexing of the beaded surface.

An object of the invention is to provide preformed continuously beaded reflector sheet material, which may be conveniently manufactured in continuous fashion and supplied in rolls, and which the user may easily cut into desired shapes and adhesively unite to any desired base or backing. This permits the user to make his own signs without special equipment and, of particular importance, it permits the user to convert ordinary signs into the improved reflexive type.

Thus highway and traffic authorities may utilize the ordinary enameled highway and traffic signs and markers which are already in use, and at small expense cut and affix thereto our sheet material either as letters, numerals or other indicia, superposed over those of the sign, or such sheet material may be cut out and applied to form a reflecting border or background, the apertures in the sheet conforming to the letters, numerals, or other indicia of the sign. Considering the large number of signs used in even a relatively small city, it is evident that cost considerations are important and that a reduction in cost of providing reflexive type signs will make possible the use of such signs on a large scale. The traffic toll in this country is of such monstrous proportions that any economically feasible means of reducing it is clearly of the greatest importance to the public, while saving of expense is obviously a direct benefit to the taxpayers.

It is essential that such reflector sheet material have the glass beads bonded in weatherproof fashion so as to avoid the expense of frequent remaking or replacement of the signs to which affixed. This means that the bonding layer in which the beads are embedded, and by which they are united to the backing of the sheet, must resist the combined effects of sunlight, heat, cold, water, varying humidity, and the mechanical impact of rain and hail and wind-blown dust, and in many parts of the country must resist the effects of freezing and thawing as well as prolonged exposure to extremes of temperature. The bonding coat must maintain its own integrity, must maintain its bond to the underlying surface, and must maintain its bond to the glass beads. Prolonged exposure to sunlight is notoriously destructive of organic coatings, and this is made the more pronounced by the fact that the glass beads act as lenses to intensify the sunlight. The bonding coat must not darken to an extent which will seriously cut down the reflecting efficiency.

We are aware that motion picture screens have been made in which a layer of small glass beads is bonded to a cloth backing by a varnish, enamel or lacquer. Such screens are not of course subjected to the action of the elements, and are not in fact weatherproof, as we have ascertained by outdoor exposure tests in which the bonding coat quickly deteriorated and caused the beads to fall away. Nitrocellulose lacquers are commonly employed in making such screens and our tests show that cellulosic bonding coats quickly deteriorate to cause rapid bead loss upon continuous outdoor exposure.

An object is to provide a flexible reflector sheet material which may be fabricated in continuous webs and wound in rolls of suitable size for shipment to purchasers, thus reducing costs and making for convenience of use. A further object is to provide a sheet which may be manually cut to desired shapes by means of shears or knife, or may be mechanically cut by inexpensive die cutting machines or by band saws which simultaneously can cut a number of stacked sheets.

Still another object is to provide reflector sheet material which is provided with an integral adhesive coating on the back, so that upon being cut to shape it may be united to the desired base without the need of applying an adhesive, and which adhesive coating does not interfere with the cutting up of the sheet material.

A further object is to provide signs or markers of high reflex reflecting brilliancy, wherein the reflex light-reflecting area (or areas) has a light-returning layer of small transparent spheres spaced in predetermined fashion from an underlying reflector by an interposed transparent solid spacing layer or binder; and the reflex brilliancy of which can be made even greater by using a metallic type reflector as hereinafter described.

Other objects and features of the invention will be apparent from the following description.

In the accompanying illustrative drawing:

Fig. 1 shows a roll of flexible reflector sheeting;

Figs. 2 and 3 are diagrams indicating, in magnified form, sections of beaded reflectors; Fig. 2 showing a construction in which the beads are embedded in a pigmented bonding coat and Fig. 3 a construction in which the beads are embedded in a transparent bonding coat and are spaced from a flat reflector by a transparent layer;

Figs. 4 and 5 are plan and sectional views, respectively, of a "stop sign" provided with a reflexive background formed of reflex reflector sheet material.

Referring to the drawing, Fig. 1 shows a roll of flexible reflector sheeting, and Fig. 2 shows in enlarged diagrammatic fashion an edge view thereof, comprised of a flexible paper backing 10 which is impregnated with a material to render it water-resistant, coated on the face side with a flexible pigmented barrier sizing film 11, which in turn is covered with a flexible weatherproof bead-bonding coat 12 containing light-reflective pigment particles in which a layer of small glass beads 13 is partially embedded. Said construction constitutes a complete reflector sheet as it may be sold ready for use, the user bonding it to a base in any manner desired. However, the invention includes a reflector sheet manufactured in ready-to-lay form, in which case a flexible water-resistant adhesive coating 14 is bonded to the back side of the backing, and a removable liner 15 may be applied as a temporary covering for the adhesive surface.

The invention contemplates the use of any thin, flexible, water-resistant backing of adequate strength and which will enable the reflector sheet to be readily cut. A fibrous fabric, such as cloth or paper, impregnated with a waterproofing or water-resistant material, provides cheapness with good utility. Other illustrative backings are felted or woven fabrics made from vegetable or animal fibres, metal fibres, glass fibres, cellulose derivative fibres, acetylated cellulose fibres, various synthetic fibres such as "nylon"; and acetylated paper, rope paper, parchmentized paper, etc. Non-fibrous backings can be used such as films or foils of metal, cellulose acetate, rubber hydrochloride, plasticized polyvinyl acetals (such as "Butvar"), synthetic rubbers, "nylon," etc. Laminated structures may be used which are comprised of dissimilar fibrous or non-fibrous sheets joined together. If porous, the backing may be impregnated or sized with a flexible sealing medium to impart desirable qualities, such as increased strength, unification of fibres, water-resistance, a smooth surface, etc., as by use of resins, rubber, artificial or synthetic rubbers, etc., used singly or in combination.

A preferred backing is newsprint paper saturated with a water-proofing material which does not greatly toughen the paper, an advantage of which (in addition to low cost) is that when the reflector sheet has been bonded to a base it cannot readily be peeled off by small boys or others attempting to pilfer, the sheet breaking or tearing locally when pried up at the edge and pulled, and yet the reflector sheet has adequate strength for intended uses.

The sizing film serves as a barrier to prevent the subsequently applied bonding coat material from striking into the paper during application and setting up, being selected so as to be insoluble, or only very slowly soluble, in the freshly applied bonding coat material and solvent vehicle thereof. This aids in obtaining in bonding coat of uniform thickness and in obtaining uniformity in the bonding of the glass beads. The sizing film preferably contains a light-reflective pigment and serves as a reflector where beads have penetrated the bonding coat and contact, or nearly contact, the sizing film.

The pigmented bonding coat holds the beads in place with a weatherproof bond and at the same time serves as a medium to reflect light coming through the beads, yet without making the composite sheet stiff or brittle.

The glass beads (which term includes equivalents) should preferably have an index of refraction within the range of about 1.5 to 2.0, and may conveniently be made from a lead glass. They are embedded to preferably ⅜ to ⅝ of their diameter. Owing to capillarity, the bonding material may creep up upon the bead surface to a higher level than that of the bonding coat surface between the beads. In order to insure firm bonding, the bonding material should contact the bead surface to above half the diameter so that the bead will be mechanically held in its socket in addition to adhesive bonding. The beads should be transparent and without surface frosting, to minimize absorption and diffusion of light. They may be tinted to color the reflected light.

With respect to bead size, the upper practical limit in this form of construction is about 20 mesh size (38–46 mils diameter); while the lower practical limit is about 200 mesh size (3 mils diameter), determined by the need of getting a smooth bead coat with uniform bonding depth of the desired degree. The preferred size is in the range of 150 to 80 mesh (4 to 10 mils diameter). The advantages of using small beads include: Obtaining a highly flexible sheet with minimum tendency to weaken the bond upon flexing; obtaining a stronger bonding of the beads due to increased surface/weight ratio per bead; less weight of glass and bonding coat per unit of area and permits a thinner bonding coat which is more flexible and less likely to crack; produces a more uniform reflection and at close range the reflector surface appears continuous owing to the smallness of the spaces between individual beads; and the beaded surface may be readily printed or coated so as to black-out or color particular areas.

The adhesive coating may be of any flexible water-resistant type—solvent activated, heat activated, or normally tacky and pressure-sensitive.

Fig. 3 shows a variant form of construction in which the water-resistant impregnated paper backing 10 is sized with a coating or film 16 which includes pigment for producing reflection. The reflecting means may be metallic pigment such as flaked aluminum to give a "mirror" type reflecting sizing film. Alternatively, a metal foil (such as aluminum) may be laminated to the backing to provide a reflecting surface, and if the metal foil or thin sheet is strong enough it may serve as the backing and the paper may be omitted. A flexible transparent spacing coating 17 is provided upon the reflecting film, which may be formed by casting one or more coatings in situ or may consist of a preformed flexible transparent film (such as cellulose acetate or a plasticized polyvinyl acetal film) laminated to the reflecting film. A transparent bonding coat 18 covers the spacing coat, and the layer of glass beads 13 is embedded therein and touches the spacing coat.

In this case light reaching the glass beads passes through the transparent bonding and spacing coats and is reflected from the reflector coat 16. Spacing the beads from the reflecting surface increases the reflection efficiency of the reflector sheet, giving a more brilliant reflection of light. The thickness of the spacing coat for optimum results depends upon the diameter of the beads and the index of refraction of the glass, and also upon the index of refraction of the bonding and spacing coats although it is preferable to keep this fairly close to that of the glass. Spacing will markedly improve the reflecting efficiency with beads made of ordinary glass (refractive index about 1.5 to 1.6). With beads having a refractive index of about 1.5, a spacing equal to approximately 20–40% of the diameter of the beads has been found to give good results, the refractive index of the bonding and spacing coats being approximately the same as that of the glass. This form of adhesive sheet may be provided with a back adhesive coating as shown in Fig. 2.

Fig. 4 shows a highway "stop" sign illustrating a use of our reflector sheeting, and Fig. 5 shows a section of such a sign in magnified diagrammatic fashion. The base of this sign is a regular embossed and enameled stiff metal sign 20 and may be one which is already in use. This has block lettering raised above the background level by embossing as indicated by reference numeral 21.

A piece of the reflector sheet 9 is cut to size to fit within the raised marginal border of the sign and has apertures cut therein corresponding to the raised lettering (or other indicia). It is then bonded to the sign, as by means of a cement; or if provided with an adhesive coating the liner is removed and the sheet is ready to lay in position, the adhesive being activated if a pressure-sensitive type is not used.

The raised lettering or other indicia project through the apertures and are as visible as before. The glass beads 13 form a background surface and this reflex reflecting part of the sign area will be visible at a great distance at night to drivers of approaching vehicles whose lights provide illumination. At first only the general glow will be seen, but this will warn that a sign is being approached; then the letters or indicia will be seen as dark areas against the bright background; and finally the enameled surface of the letters will be seen.

With a reflector sheet of sufficient thinness and flexibility, it may simply be placed over the sign base without cutting of apertures and be pressed to conform to the embossings. The raised portions of the reflector sheet may be "blacked out," by printing or coating the raised beaded areas with a black or colored ink or paint, to provide lettering or other indicia visible as in an ordinary sign, with a reflex reflecting surrounding background.

The reflector sheeting may of course be cut into letters, numerals, arrows, or other indicia, and these may be adhesively united to any desired base. Reflector sheeting of contrasting color may be used as a background. Thus a white reflector sheet may be applied to the sign base, and indicia cut from colored type reflector sheeting may be bonded to the surface of the base reflector sheet.

The glass beads should preferably be thoroughly cleaned prior to coating to facilitate anchorage to the bonding coat by removing contaminating substances which interfere with proper contacting. As an example, the beads may be washed with a hot 5% solution of trisodium phosphate, and rinsed alkali-free with water, followed by drying. This improves the weatherproofness of the product.

Prior to application, the beads may if desired be coated with a transparent film to further improve anchorage and weatherproofness. As an example, the beads may be coated with a solution of "A stage" Bakelite (hydrophilic), followed by heating to produce a film coating "B stage" Bakelite (which provides a hydrophobic surface). A further example is to film the beads with plasticized polyvinyl butyral in a volatile solvent such as Cellosolve (ethyleneglycol monoethylether). After application to form the reflector sheet, the exposed parts of the films may be cleaned off the beads.

A transparent sizing coat may be applied over the beaded surface to hold the beads more firmly in place and reduce the effects of weathering upon the bonding coat. This bead sizing should be thin so as to closely conform to the bead surfaces, and should be weather-resistant. An example of a suitable sizing is the polyvinyl butyral composition of Example 6.

Example 1

Newsprint paper, which is a light, porous and bibulous wood fibre paper of about 30 lbs. per ream weight, is passed between a pair of vertically positioned horizontal rolls and back around the top roll, the lower roll dipping in a saturating varnish solution. The rolls are set to squeeze the paper just enough to remove excess, the body of the paper being completely penetrated and saturated. The impregnated paper web is festooned on racks and passed through a drying and baking oven where it is subjected to 165°–175° F. for about 48 hours, to remove the solvent and set-up the impregnant. The saturating solution has the following formula in parts by weight:

| | Parts |
|---|---|
| Bakelite XR–4006 (solid phenol-aldehyde resin) | 14.0 |
| Volatile petroleum hydrocarbon solvent (134°–185° C. boiling range) | 30.0 |
| Bodied long varnish oil A (12½% tung oil; 25% soy bean oil; 62½% linseed oil; 70–95 centipoise at 77° F.) | 47.5 |
| Bodied long varnish oil B (50% tung oil; 25% soy bean oil; 25% fish oil; 210–350 centipoise at 150° F.) | 8.7 |
| Castor oil | 14.0 |

The Bakelite is dissolved in the solvent and the previously prepared bodied oils and castor oil are mixed in.

This paper treatment serves to waterproof the paper without adding greatly to its strength. The treated paper may be wound in rolls and stored until needed or may be sent directly to the next operation.

The paper is next sized by passing between rollers, the lower of which dips in the sizing solution, which is a fast drying material and does not penetrate into the body of the impregnated paper. Approximately 20 grains per 24 sq. inches of surface is the coating weight (wet) of the solution. The coated paper is dried at about 140° F. for 20 minutes to remove the solvent. The thickness of the dried sizing film is about 1.25 mils. The formula of this sizing solution is:

Part 1:

| | Parts |
|---|---|
| ½ sec. nitrocellulose | 19.2 |
| Cellosolve (ethyleneglycol monoethylether) | 38.3 |
| Petroleum solvent (134°–185° C. boiling range) | 20.8 |

Part 2:

| | |
|---|---|
| "Rezyl 53" | 46.0 |
| Tricresyl phosphate | 5.8 |
| Petroleum solvent | 15.0 |
| Titanium oxide pigment | 30.7 |
| Ultramarine blue (white intensifier) | Trace |

The ingredients of part 2 are mixed, with the pigment being ground in to disperse it uniformly. The ingredients of part 1 are dissolved together and this solution is added to part 2 with mixing to provide a uniform mixture.

In the above formula, the "Rezyl 53" is a liquid alkyd resin composition sold by American Cyanamid Co., composed of 65% of a two-component type alkyd resin and 35% of a plasticizer of the non-drying oil or non-drying fatty acid type. It is illustrative and may be replaced by a similar material. An illustrative alkyd resin is the well-known kind made from phthalic anhydride and glycerine. Castor oil is illustrative of non-drying oils and ricinoleic acid is the acid which can be derived therefrom as for example by heating together the glycerine and castor oil before adding the phthalic anhydride.

The sized paper is then coated with the bonding coat solution by passing between rollers, the lower roller dipping in the solution and transferring it to the sizing surface, the sizing film acting as a barrier to prevent penetration. The rollers are set to give a coating weight selected with reference to the size of the glass beads to be used. For 80 mesh beads the coating weight (wet) may be 18–24 grains per 24 sq. inches of surface, in order that the beads may be embedded about half way. The coated web moves back over the upper roller and within a few feet passes under a hopper which feeds the beads uniformly in a thin ribbon upon a turning roller from which they drop upon the moving paper web. A batter may be located beneath the paper to agitate it so that the beads will fill in to form a closely packed and uniform layer and so that the beads will properly penetrate into the bonding coat. The web then passes down around a roller so that excess beads will fall off and then is festooned on racks and put through a baking oven. The heating drives off the solvent and sets up the resin, and may involve a temperature of 165°–185° F. for 48 hours. The following formula is used for the bonding coat solution:

| | Parts |
|---|---|
| Glyptal resin No. 2452 (solution weight) (three-component oil-soluble air-drying alkyd resin in 50% solution with hydrocarbon solvent) | 52.6 |
| Antimony oxide | 10.1 |
| Titanium dioxide | 15.2 |
| Xylol | 11.7 |
| Mineral spirits (volatile petroleum solvent) | 7.9 |
| 2% cobalt naphthenate in mineral spirits | 0.071 |
| 16% lead naphthenate in mineral spirits | 0.174 |

The Glyptal resin is an alkyd resin of the oil-soluble three-component type made from glycerine, phthalic anhydride, and a drying oil or drying oil acid. These are well known in the coating art for use in making air-drying enamels which can be baked at low temperatures compared to those made from straight two-component alkyd resins. The titanium oxide provides a brilliant white pigment and the antimony oxide also serves as a white pigment and has the property of minimizing chalking and increasing weathering resistance. The metal naphthenates function as driers to aid in curing the resin at lower temperatures and in a shorter time. The resin is dissolved in the solvents and the pigments are ground in, with the driers being added shortly before coating.

This completes the manufacture when no adhesive is applied to the back. The back may be, and desirably is, coated with adhesive to provide a reflector sheet material ready for application without use of adhesive by the user. This adhesive coating may be of the solvent-activated, heat activated, or normally tacky and pressure-sensitive type (such as one of the rubber-resin type). The preferred type is one which the user can activate either with a solvent or by use of heat, and is illustrated by the following:

| | Parts |
|---|---|
| Rubber base (45% reclaim rubber; 45% zinc oxide; 10% latex crepe; combined on rubber mill) | 102 |
| Rosin | 29 |
| "Nevillite resin" of 150° C. melting point | 21 |
| Oleum spirits (volatile solvent) (volatile petroleum hydrocarbon solvent of 306°–424° F. boiling range) | 80 |
| Ethyl alcohol (denatured with gasoline) | 1 |

The components are mixed in an internal mixer (such as a "Mogul") until a homogeneous solution is obtained. The ethyl alcohol serves as a viscosity-reducer and may be omitted by using a larger proportion of the solvent.

In the above formula, the "Nevillite resin" is a cycloparaffin resin made by the Neville Co., Pittsburgh, U. S. A., and constitutes the product obtained by hydrogenating an indene-coumarone resin so as to obtain a substantially saturated resin which is transparent and substantially colorless.

The adhesive solution is coated upon the back surface of the beaded sheeting, as by use of a doctor blade, and the coated sheeting is then festooned upon racks and put through a drying oven to drive off the solvent. Six hours at 165° F. is a suitable combination for the drying step.

When the coated web is removed from the drying oven it is wound into rolls and at the same time a liner of regenerated cellulose film ("Cellophane") is wound in so as to contact the adhesive surface and be detachably adhered thereto, thereby covering the adhesive surface to prevent sticking of the adjacent beaded surface and to facilitate use of the sheeting. This liner can be removed, after the sheet is cut to shape in making up signs, or whenever desired, by moistening with water and peeling off.

The adhesive may be activated by moistening with V. M. P. naphtha, heptane or gasoline, etc. The sheet is then applied to the sign base and is held by the tacky adhesive during setting of the adhesive as the result of solvent evaporation. Or the reflector sheet may be applied directly to the base and activated by heating with an iron or by placing in an oven (at say 225° F. for five minutes), followed by rolling to produce firm contacting.

The foregoing reflector sheet employs a bonding coat for the glass beads which includes white pigment to give a white reflection to white light. A colored reflected light can be obtained by substituting colored pigment for part or all of the white pigment. Thus the bonding coat formula may be altered by substituting 21 parts of chrome yellow pigment for the antimony oxide and titanium oxide to give a yellow reflector.

This reflector sheet is highly flexible and is wound on a 3 inch core in making up rolls for the trade. Because of its flexibility it could be wound on a 1 inch core if desired.

Samples of the foregoing example reflector sheet were subjected to weather exposure for one year; some at Houston, Texas, where extreme conditions are encountered in the way of high temperatures and brilliant sunlight, wide variation in temperatures during a year, high average temperature during a year, high humidities and high rainfall; and some at St. Paul, Minnesota, where extremes of heat and cold, and snow, freezing and thawing, are encountered during the year. At both places the samples were united to a base and faced south at an angle of 45° to the horizontal. In both cases the reflector sheet was of the plain type without adhesive coating upon the back. At Houston, the samples were united to asphalt shingles by first softening the asphalt by heating, and the shingles were then nailed to a fibre-board base for exposure. At St. Paul, the samples were united to metal plates using a chlorinated alkyd resin cement, and the plates nailed to a fibre-board base for exposure. These samples were exposed in April-May of 1939 and after a full year of exposure were found in excellent condition with no loss of beads and with no visible sign of deterioration of the bead-bonding coat.

As a comparison, samples of the various brands of glass bead type moving picture screens found on the market were exposed in the same places and beginning at the same time. These quickly failed and at the end of the year showed total (or 99 plus %) bead loss and the bonding coat in each instance had either completely disappeared or was so badly chalked and deteriorated as to be valueless. Examination of these screens indicated that some employed nitrocellulose bead-bonding coats and some employed resin-varnish type bead-bonding coats. Comparative tests in accelerated weathering cycles (using a "Weatherometer" for exposure) also showed a tremendous difference. Similar lack of utility for present purposes has been found in samples made with ethyl cellulose and with cellulose acetate bonding coats.

*Example 2*

Instead of using a three-component air-drying alkyd resin in the bonding coating formula, as set forth in the foregoing example, use may be made of a five-component air-drying type in which a phenol-aldehyde type resin is cooked in or blended with the other components to improve water-resistance and make for a harder bonding coat. This is illustrated by the following chart showing illustrative proportions of components for the alkyd resin.

| | Range | Illustration |
|---|---|---|
| | *Percent* | *Percent* |
| Phenol-formaldehyde | 0–40 | 20 |
| Drying oil or drying oil acid | 18–60 | 37 |
| Glycerine-phthalic anhydride | 24–70 | 43 |

As a further illustration of a bonding coat formula employing a five-component alkyd resin, it may be stated that use may be made of Du Pont white stencil paste, or of yellow stencil paste. This is applied to the sized paper in place of the bonding coat formula of Example 1, followed by the same bead application and baking steps. The white paste contains 26.8% resin, 69% titanium oxide and 4.2% hydrocarbon solvent. The yellow paste contains 30.8% resin, 58.5% lead chromate and 10.7% hydrocarbon solvent. The resin is a phenol-formaldehyde modified alkyd resin containing a drying oil or drying oil acid of the linseed type.

*Example 3*

Other modified alkyd resins may be used, such as a four-component type formed by blending a glycerine-phthalic anhydride resin (for example, Rezyl No. 53) mixed with a urea-formaldehyde resin (for example, Beetle No. 227-8, which is a 50% solution of the resin in a solvent composed of 60% butyl alcohol and 40% xylol). Thus these may be combined to provide 4 parts of the alkyd resin solids for each part of the urea-formaldehyde resin solids, by mixing 2 parts of the alkyd resin with 1 part of the urea-formaldehyde solution. The resulting resin solution may be substituted for the Glyptal resin solution of the bonding coat formula of Example 1, with such modification of solvent proportions as may be desired. In this case the omission of the drying oil or drying oil acid is compensated for by the inclusion of the urea-formaldehyde resin, the presence of the latter causing the resin base to set up at moderate temperatures. However, a drying oil or drying oil acid may be included if desired, as by employing a three-component alkyd resin (for example, Rezyl 1125-1) in conjunction with a urea-formaldehyde resin (for example, Beetle No. 227-8).

Example 4

This example illustrates a bonding coat formula containing a colored pigment.

|  | Parts |
|---|---|
| 50% solution of Rezyl No. 330-5 in xylol | 5 |
| Lead chromate (yellow pigment) | 2½ |

The ingredients are ground together in a paint mill and the composition is then ready for use. A baking time of 48 hours at 175° F. may be used.

Example 5

This example illustrates a type of bead-bonding coat formula in which synthetic resins are not used:

|  | Parts |
|---|---|
| Ester gum (low-acid type) | 68 |
| Tung oil (mildly bodied by heating) | 250 |
| Titanium oxide (white pigment) | 500 |
| Oleum spirits (volatile solvent) | 50 |
| Cobalt naphthenate drier as 4% solution in oleum spirits | 1 |

All ingredients, except the drier, are ground together in a paint mill; and drier is stirred in at any time before coating. A baking time of 48 hours at 175° F. may be used.

Example 6

This example illustrates a bonding coat formula employing a resin base of the "polyvinyl acetal" type, which resins constitute a series which can be made by reacting polyvinyl alcohol with an aldehyde (formaldehyde, acetaldehyde, butyraldehyde, etc.). These resins can be plasticized to form very tough and flexible films and coatings which are highly resistant to sunlight and weathering.

|  | Parts |
|---|---|
| Polyvinyl butyral ("Butvar") | 25.0 |
| Tricresyl phosphate (plasticizer) | 2.5 |
| Cellosolve (ethylene glycol monoethyl ether) | 75.0 |

The polyvinyl butyral is dissolved in the Cellosolve and the plasticizer added. This may be used to provide a transparent bonding coat, or pigment may be incorporated to make a pigmented reflecting bonding coat. No baking is needed. The coating may be dried, for solvent removal, by heating to 165° F. for 1 to 2 hours.

Example 7

This example illustrates an alternative form of treatment for waterproofing the paper backing. Two batches are compounded, to be united before paper treatment, having the following formulae, in parts by weight:

|  | Parts |
|---|---|
| Rubber-resin solution: |  |
| Latex crepe | 100 |
| Rosin | 160 |
| Zinc oxide | 100 |
| Beta-naphthol (optional antioxidant) | 1 |
| Oleum spirits (volatile petroleum hydrocarbon solvent of 306°-424° F. boiling range) | 200 |
| Vulcanizer solution: |  |
| "Tetrone - A" (dipentamethylene-thiuram-tetrasulfide) | 3 |
| Latex crepe | 3 |
| Oleum spirits | 24 |

The rubber-resin solution is prepared by milling the rubber and zinc oxide for 30 minutes, at about 150°-160° F., and the resultant sheet is then taken off the rubber mill and placed in an internal mixer (such as a Baker Perkins Mogul mixer), the heating jacket of which carries steam at 40 lbs. pressure, and which has previously been allowed to warm up. A small proportion of the rosin (say 10–25%) is added to make for lubrication, and the mass is mixed for about 8–10 hours, or until reduced to a semi-fluid consistency, thereby breaking down the rubber and making it more plastic, less elastic and more penetrative. The balance of the rosin is added, care being taken to add slowly to avoid excessive foaming caused by the water evolved from the reaction between the rosin and the zinc oxide, and mixing is continued for another hour. The beta-naphthol is added (if used), and the steam turned off and cooling water introduced into the heating jacket of the mixer. The oleum spirits is then added with continued mixing for half an hour, or until the mixture is homogeneous. The resulting solution may then be drawn off and stored until use.

The vulcanizer solution is prepared by milling together the "Tetrone-A" and rubber and dissolving in the oleum spirits. This procedure facilitates admixture of the vulcanizer with the rubber-resin solution.

The vulcanizer solution is mixed in with the rubber-resin solution just prior to use of the latter for the paper treatment, as the composite starts to gel within a few hours, even at room temperature.

Following impregnation, the paper is festooned on racks and put through a drying oven to remove the solvent and vulcanize the rubber. Various time and temperature combinations may be used to produce substantially equivalent results. An oven treatment involving 12 hours at 170° F. gives good results.

This paper treatment results in a waterproof product having an excellent aging life and the tensile strength of the paper is increased, which is advantageous. Vulcanization is not sufficient to build up elasticity and the paper has a dead-stretch.

The use of this type of backing permits of making reflector sheets which can be conformed to sign embossings without cutting. The projecting areas can then be blacked out by running a printing roll over the sign, resulting in the wording or indicia being reproduced with a surrounding background of clear beaded surface.

The "Tetrone-A" is an example of a self-vulcanizing accelerator of the thiuram polysulfide type, another example of which is "Tuads" (tetramethyl-thiuram-disulfide). When using the latter, a greater amount must be employed to obtain equivalent results as there is only one sulfur atom per molecule (instead of three) available to produce vulcanization. By using a greater amount of vulcanizer (say 10 parts "Tetrone-A" per 100 parts rubber), a backing having a live-stretch can be obtained. The zinc oxide serves as an activator in the vulcanization; also as a reinforcing pigment to make for greater firmness of the impregnant; and also reacts with the rosin to form zinc abietate (hardened rosin) which is the actual resin introduced into the paper. The resin aids in cementing the fibres of the paper and in making the impregnant more penetrative, plastic and inelastic. Other solid resins can be used, such as hydrogenated rosin, ester gum and "Nevillite resin" (a cycloparaffin resin); as well as fluid resins such as "Hercolyn" (hydrogenated methyl abietate), Abalyn (methyl abietate) and "Vistac" (isobutylene polymer which is viscid and sticky), since the vulcanization can be employed to firm up the impregnant. Mixtures of two or more of the resins may be used. The preferred resin range is 25–400 parts per 100 parts rubber. The zinc oxide can be varied over a wide range.

Example 8

This example illustrates a form of construction in which the sizing coating provides the reflector surface and a transparent spacing coat is used with a transparent bonding coat (see Fig. 3).

The paper backing is impregnated as in Example 1, to waterproof it, and is sized with a composition having the following formula:

| Varnish base: | Parts |
|---|---|
| Tung oil | 90.0 |
| Linseed oil | 30.0 |
| Ester gum (low-acid type) | 12.5 |
| W. W. gum rosin | 12.5 |
| "Paranol No. 1-Hard" (Paramet Chemical Corp.) (a modified phenol-formaldehyde resin having a melting point of 250°–260° F. and an acid number of 12–16) | 37.5 |
| Red lead | 1.1 |
| Cobalt linoleate | 0.5 |
| Powdered manganese oxide | 0.01 |
| Petroleum spirits thinner | 190.0 |

These ingredients are combined and cooked to varnish consistency.

To 150 parts of the above varnish base, 15 parts of finely divided aluminum flakes (such as XXX aluminum lining bronzing powder) are stirred in. The composition is now ready for coating, in the manner specified in Example 1, followed by baking at 165° F. for 4 hours. The aluminum flakes rise to the top of the wet coating and lie parallel with the paper, resulting in a final dried size coating which provides metallic reflection from its surface closely approaching that from flat polished metal.

This reflecting film is then covered with a transparent spacing coat. For example, a polyvinyl butyral composition as set forth in Example 6 may be applied in amount such that upon drying a layer is provided which is approximately 20–40% as thick as the diameter of the glass beads where beads of approximately 1.5 refractive index are used.

Upon this dried spacing coat is applied a bonding coat of the same composition, in amount to provide proper anchorage for the beads, and the beads are coated and embedded therein, followed by oven drying to dry the bonding coat before the spacing coat has been softened to a point causing appreciable penetration of the beads. If desired, a spacing coat composition can be used which is different from the bonding coat composition and relatively insoluble in the solvent employed for the latter.

All of the foregoing bonding coat compositions are of the "air-drying type," by which it is meant that the wet coating will dry (including curing where resin advance is involved) at room temperature or at a moderately elevated temperature, and preferably the latter is used to hasten the process and improve hardness and durability; so that temperatures below 250° F. can be employed. This is to be contrasted with coatings and enamels which must be baked at high temperatures in order to be properly cured.

In referring broadly to the reflector sheet as being "flexible," it is meant that the sheeting can be wound upon cores of about 18 inch diameter or less and unwound to flat form without damage. All of the examples relate to preferred forms which can be wound upon 3 inch diameter cores or less.

With reference to the term "weatherproof" as applied to the reflector sheet and to the exposed bead-bonding coat, it is unfortunate that a specification or criterion cannot be given in terms of accurately controlled accelerated weathering tests or other tests performed in a laboratory. A great deal of work has been done in attempting to devise a criterion of this kind, but without success in finding one that closely correlates with the results of actual outdoor exposure, owing to the combined action of many factors at work in actual weathering. Laboratory tests (such as exposure in a "Weatherometer") serve to weed out reflector sheets which are obviously unsuitable (such as motion picture screens found on the market) and give some indication as to those which receive a high rating, but that is about all that can be said in the present state of development.

Outdoor exposure at Houston, Texas, with test panels facing south with a 45° inclination, has thus far provided the best criterion. This location is used by a number of concerns (such as roofing companies) for the same purpose. It has been found that reflector sheets suffer greater weathering per year cycle at Houston than at Saint Paul, Minnesota, and hence the results at Houston may be safely accepted as providing a general criterion, in view of the severity and wide variety of weathering conditions encountered at these two places.

For the purposes of this specification and claims, the term "weatherproof," as applied to the bonding coat and to the reflector sheet as a whole, may be defined as meaning that the reflector sheet will stand at least a full year at Houston, Texas (facing south with 45° inclination) without suffering over 25% loss of beads, and without suffering such discoloration as will cause a loss of reflection efficiency of more than 25%. All of the examples given in this specification fall well within this definition.

As a further example of a use for the reflector sheet material, mention is made that it can be cut into strips to be cemented to highways as center striping, and may be used as a marking for abutments, etc.

What we claim is as follows:

1. A flexible weatherproof light reflector sheet adapted to the making of signs and indicia for outdoor use and which can be readily cut to desired shapes and united to base surfaces, comprising a flexible water-resistant support including a flexible weatherproof bead-bonding layer and a multiplicity of contiguous small glass beads partially embedded therein to form a continuous surface layer, light reflecting means associated with the beads to produce in combination therewith a "reflexive" reflection of incident light, and an integral back coating of water-resistant adhesive adapted to firmly bond the reflector sheet to base surfaces to which applied.

2. In a sign or marker adapted for outdoor exposure and having a relatively rigid base, a flexible weatherproof light reflector sheet adhesively united to the base and comprised of a flexible water-resistant support including a flexible weatherproof bead-bonding layer and a multiplicity of contiguous small glass beads partially embedded therein to form a continuous surface layer, and light reflecting means incorporated behind the beads to produce in combination with the beads a "reflexive" reflection of incident light.

3. A flexible weatherproof light reflector sheet adapted to the making of signs and indicia for outdoor use, comprising a flexible water-resistant backing and a reflector surface joined thereto, a transparent flexible spacing coat covering said reflector surface, a transparent flexible weatherproof bead-bonding coat united to said spacing coat, and a layer of contiguous glass beads partially embedded in the bonding coat so as to closely approach the spacing coat, the thickness of the spacing coat being such as to increase the brilliance of reflection of incident light as compared to the brilliance produced if such spacing coat were omitted, and said reflecting surface and beads cooperating to produce "reflexive" reflection of incident light.

4. An article according to claim 3 in which said transparent spacing coat separates the beads and reflector surface by a distance equal to about 20–40% of the average bead diameter.

5. A flexible weatherproof reflex light reflector sheet adapted to be supplied in roll form and to be readily cut to desired shape for use in making signs and indicia for outdoor use, comprising a flexible water-resistant backing having a flat light reflecting surface, a light-returning layer formed of a multiplicity of contiguous small glass beads spaced from said reflecting surface by a distance equal to about 20–40% of the average bead diameter, and an interposed flexible weatherproof transparent bead bonding and spacing solid means holding said beads in the spaced relation.

6. A flexible weatherproof light reflector sheet adapted to be supplied in roll form and to be used in making signs and indicia for outdoor use, comprising a flexible backing of fibrous paper impregnated with a waterproofing material, a flexible light reflector on one face thereof, a transparent flexible spacing layer covering the reflector, a transparent flexible weatherproof bead-bonding layer covering the spacing layer, a layer of contiguous small glass beads partially embedded in the bonding layer and thereby held in spaced relation from the reflector by a transparent flexible solid matrix, the reflector and beads co-operating to produce "reflexive" reflection of incident light and the extent of spacing being such as to increase the brilliancy as compared to that produced if spacing were not present.

7. An article according to claim 6 in which the beads are spaced from the reflector by a distance equal to about 20–40% of the average bead diameter.

8. In a sign or marker adapted for outdoor exposure and having a relatively rigid base, a preformed flexible weatherproof reflex light reflector sheet adhesively united to the base and comprised of a flexible water-resistant backing having a flat light reflecting surface, a light-returning layer formed of a multiplicity of contiguous small glass beads spaced from said reflecting surface, and an interposed flexible weatherproof transparent bead-bonding and spacing solid means holding said beads in the spaced relation.

9. An article according to claim 8 in which the beads are spaced from the reflecting surface by a distance equal to about 20–40% of the average bead diameter.

10. In a sign or marker adapted for outdoor exposure and having a relatively rigid base, a preformed flexible weatherproof light reflector sheet adhesively united to the base and comprised of a flexible backing of fibrous paper impregnated with a waterproofing material and adapted to break or tear so as to minimize attempts at pilfering, a flexible weatherproof bead-bonding layer united to the backing, an exposed layer of contiguous small glass beads partially embedded in said bead-bonding layer, and light reflecting means incorporated behind the beads to produce in combination with the beads a "reflexive" reflection of incident light.

11. A flexible weatherproof light reflector sheet adapted to the making of signs and indicia for out-door use and which can be readily cut to desired shapes and united to base surfaces, comprising a flexible backing of fibrous paper impregnated with a waterproofing material, a multiplicity of contiguous small glass beads forming a surface layer, an interposed flexible weatherproof bead-bonding layer in which said beads are partially embedded, light reflecting means incorporated behind the beads to produce in combination with the beads "reflexive" reflection of incident light, an integral back coating of water-resistant adhesive united to the reverse side of the backing and adapted to firmly bond the reflector sheet to base surfaces to which applied, and a removable liner covering the outer surface of the adhesive coating.

12. The article of claim 11 in which the removable liner is a regenerated cellulose film which can be readily removed by moistening with water and peeling off.

13. A flexible weatherproof light reflector sheet adapted to the making of signs and indicia for outdoor use and which can be readily cut to desired shapes and united to base surfaces, comprising a flexible and weatherproof binder sheet, a continuous layer formed of a multiplicity of contiguous small transparent glass beads partially embedded in the binder sheet, presenting a front surface of convex lens elements, and light reflecting means incorporated behind the beads to produce in combination with the beads "reflexive" reflection of incident light, the back surface of the light reflector sheet being adhesive and adapted to provide a waterproof bonding of the reflector sheet to base surfaces to which applied in making up signs or other indicia.

14. A method of making a reflex light reflector sheet which comprises joining a thin transparent solid spacing layer of predetermined thickness to a flat light reflecting surface, applying a liquid transparent binder over said solid spacing layer and embedding a layer of small transparent spheres therein, said spheres having a diameter substantially greater than the thickness of said spacing layer and the latter serving as a positive solid means for spacing the beads a predetermined distance from the reflector, and afterwards setting up the liquid binder to a solid state so that the layer of spheres is held in fixed position.

15. A reflex light reflector sheet comprising a thin transparent solid spacing layer having a flat light reflector on one face, a distinct transparent binder layer on the other face and a layer of small transparent spheres partially embedded therein and spaced in definite predetermined fashion from the reflector by said spacing layer, the beads having a diameter substantially greater than the spacing distance.

16. In a sign or marker, a reflex light-reflecting area comprised of a light-reflector, a thin transparent solid spacing layer of predetermined thickness covering the surface of the reflector, a light-returning layer of small transparent spheres overlying the spacing layer, the spacing distance being such as to substantially increase reflex-reflection brilliancy as compared with no spacing, and a distinct binder overlying said spacing layer and in which said spheres are partially embedded and held so as to be spaced in definite predetermined fashion from the underlying reflector by the interposed spacing layer and in optical communication with the reflector.

17. In a sign or marker, a high-brilliancy reflex light-reflecting area comprised of a light reflector, a thin and flexible transparent solid spacing layer of predetermined thickness covering the surface of the reflector, a light-returning layer of small transparent spheres overlying the spacing layer and having an average diameter not exceeding about 10 mils and substantially greater than the thickness of said layer, and a distinct transparent binder overlying said spacing layer and in which the spheres are partially embedded and held so as to be spaced in definite predetermined fashion from the underlying reflector by the interposed spacing layer.

18. The article of claim 17 wherein the spheres are spaced from the reflector by a distance equal to about 20–40% of the average bead diameter.

19. A flexible and weatherproof reflex reflector sheet material adapted to be readily cut and applied to a desired base for making outdoor signs or indicia, comprising a flexible and weatherproof transparent support and binder sheet having a continuous light-returning layer of small transparent spheres embedded in the front face and spaced from the back face so as to substantially increase reflex-reflection brilliancy as compared with no spacing, and an underlying flexible reflector having a reflective surface bonded to the back face of said transparent sheet.

20. A flexible high-brilliancy reflex reflector sheet material adapted to be readily cut and applied to a desired base for making outdoor signs or indicia, comprising a flexible transparent support and binder sheet having a continuous light-returning layer of small transparent spheres embedded in the front face and spaced from the back face by a distance less than the average sphere diameter and such as to substantially increase reflex-reflection brilliancy as compared with no spacing, and an underlying flexible reflector having a metallic reflecting surface bonded to the back face of said transparent sheet.

21. A high-brilliancy reflex reflector sheet material adapted to be wound in rolls and to be readily cut and applied to a desired base for making outdoor signs or indicia, comprising a flexible transparent support and binder sheet having a continuous layer of exposed contiguous small glass beads embedded in one face and spaced from the other face to provide a surface of convex lens elements on the front side and a flat surface on the rear side which is spaced from the beads, and a coextensive continuous metallic reflector coating in contact with said flat rear surface of the transparent sheet, formed of metallic reflecting flakes lying substantially parallel to the plane of the sheet and held by a binder, and a flexible backing sheet united to the reflector coating.

22. In a sign or marker, a high-brilliancy reflex light-reflecting area comprised of a backing having a metallic type reflective surface, a light-returning layer of small transparent spheres spaced from the reflective surface in a controlled predetermined manner, the spacing distance being such as to substantially increase reflex-reflection brilliancy as compared with no spacing, and a transparent solid adhesive matrix bonded to the reflective surface, in which said spheres are partially embedded and held in the spaced position.

23. In a sign or marker, a high-brilliancy reflex light-reflecting area comprised of a backing having a metallic foil laminated thereto so as to provide a metallic type reflective surface, a light-returning layer of small transparent spheres spaced from the reflective surface in a controlled predetermined manner, the spacing distance being such as to substantially increase reflex-reflection brilliancy as compared with no spacing, and a transparent solid adhesive matrix bonded to the reflective surface, in which said spheres are partially embedded and held in the spaced position.

24. A flexible and weatherproof reflex light reflector sheet which can be readily cut to desired shape and affixed over an embossed metal sign base so as to conform to the embossed surface thereof as herein described, comprising a flexible and weatherproof sheet support having substantial stretch allowing conformation to the irregular surfaces of embossed sign bases, a layer of small transparent spheres embedded in one face of the sheet to provide a refracting light-returning layer of convex lens elements, and light reflecting means incorporated behind the spheres to produce in combination therewith a "reflexive" reflection of incident light.

25. A reflector sheet according to claim 24 having an integral adhesive back surface adapted to firmly bond the reflector sheet to base surfaces to which applied.

HARRY HELTZER.
JOHN EDMUND CLARKE.